US005612871A

United States Patent [19]

Skogmo

[11] Patent Number: 5,612,871

[45] Date of Patent: Mar. 18, 1997

[54] QUALITY MONITORED DISTRIBUTED VOTING SYSTEM

[75] Inventor: David Skogmo, Albuquerque, N.M.

[73] Assignee: Sandia Corporation, Albuquerque, N.M.

[21] Appl. No.: 289,861

[22] Filed: Aug. 12, 1994

[51] Int. Cl.[6] .................................................. G06F 17/60

[52] U.S. Cl. ............................ 395/212; 235/386; 379/92; 379/97; 379/386

[58] Field of Search .................................... 364/401, 409; 235/386; 379/92; 348/1, 2; 455/2

[56] References Cited

U.S. PATENT DOCUMENTS 5,218,528 6/1993 Wise et al. .............................. 364/409

5,278,753 1/1994 Graft, III ................................. 364/409

5,412,727 5/1995 Drexler et al. ............................ 380/24

*Primary Examiner*—Gail O. Hayes

*Assistant Examiner*—Steven R. Yount

*Attorney, Agent, or Firm*—Gregory A. Cone

[57] ABSTRACT

A quality monitoring system can detect certain system faults and fraud attempts in a distributed voting system. The system uses decoy voters to cast predetermined check ballots. Absent check ballots can indicate system faults. Altered check ballots can indicate attempts at counterfeiting votes. The system can also cast check ballots at predetermined times to provide another check on the distributed voting system.

10 Claims, 4 Drawing Sheets

QUALITY MONITORED DISTRIBUTED VOTING SYSTEM

This invention was made with Government support under Contract DE-AC04-94AL85000 awarded by the U.S. Department of Energy. The Government has certain rights in the invention.

BACKGROUND OF THE INVENTION

Elections typically require the personal attendance of each voter at one of a limited number of polling places. Improving communications infrastructure make is feasible to hold elections in a distributed fashion. In a distributed election, there are many polling locations, potentially one for each voter. Voters communicate their votes via existing communications networks. Distributed elections could save voters time, as well as save the holders of an election money by requiring fewer dedicated polling resources. The current telephone system is one example of an existing communications system that could be utilized in a distributed voting scheme.

In a distributed voting system each voter must first establish a connection to a vote gathering facility. The voter can then transmit the vote to the vote gathering facility, which tabulates the results. While the basic approach is very simple, there are many opportunities for fraud by outsiders and for undetected communications problems to compromise the integrity of the election results.

A simple first step to reduce the potential of fraud is to issue each voter a unique identifier. The system can then check to make sure that no one casts more than one vote. This does not preclude the interception and alteration of genuine votes, however. It also cannot detect counterfeiters mimicking actual voters who do not cast ballots. There is also no way to distinguish between the real and the counterfeit in the case of duplicate votes being received.

An additional problem is posed by the communications network. Since it is not guaranteed that all voters will cast ballots, some assigned identifiers will not result in ballots communicated to the vote gathering facility. Unfortunately, this situation is indistinguishable from ballots lost due to communications network breakdowns.

Given the rapidly improving state of distributed communications, the continuing need for elections, and the apparent difficulties with simple distributed voting systems, there is an unmet need for improvements that can detect compromises and faults. The current prevalence of telephone communications make it especially desirable that such improvements be suitable for implementation with existing telephone communications networks.

SUMMARY OF THE INVENTION

An object of the present invention is to provide a distributed voting system that can detect attempts to cast unauthorized votes.

Another object of the present invention is provide a distributed voting system that can detect faults that can lead to lost votes.

A further object is to provide in a distributed voting system the capability to cast predetermined votes, and infer by their absence or alteration faults or compromise of the voting system.

A further object is to provide these capabilities in a distributed voting system suitable for implementation on standard telephone lines.

Additional objects, advantages, and novel features will become apparent to those skilled in the art upon examination of the following description or may be learned by practice of the invention. The objects and advantages of the invention may be realized and attained by means of the instrumentalities and combinations particularly pointed out in the appended claims.

A primary difficulty in detecting faults or compromise of distributed voting systems stems from the fact that the timing, quantity, and contents of votes are not known. This makes it impossible to check whether all have arrived, and whether any have been intercepted and altered or counterfeited. This invention addresses this difficulty by injecting into the system check votes with predetermined values. The quantity, contents, and timing of these check votes are known, so it is possible to detect missing or altered check votes. Faults and fraud will affect check votes as well as genuine votes, allowing for the detection of problems with the integrity of the distributed voting system by detecting faults with the communication of check votes.

In one embodiment of the invention decoy voters are added to a distributed voting system. The decoy voters can transmit check votes to a vote gathering facility. The vote gathering facility can compare the values received with the check votes against the expected values. Differences imply that the integrity of the system is in question, due either to counterfeiting or system malfunction. Missing check votes also indicate that some genuine votes may have been lost.

In a further embodiment the vote gathering facility transmits DTMF (Dual Tone MultiFrequency) tones along with verbal prompts to each voter. The decoy voter can then respond in a human-like fashion to the vote gathering facility's queries, making it difficult for an outsider to discern check vote from genuine votes. The decoy voter can also be implemented to wait varying or random times before responding to a query, further mimicking a genuine voter. DTMF tones are also used to communicate vote values from both decoy and genuine voters to the vote gathering facility. DTMF tones are standard in push button telephones, making this embodiment well suited for contemporary telephone communications systems.

DESCRIPTION OF THE FIGURES

The accompanying drawings, which are incorporated into and form part of the specification, illustrate an embodiment of the invention and, together with the description, serve to explain the principles of the invention.

DETAILED DESCRIPTION OF THE INVENTION

Figure 1:
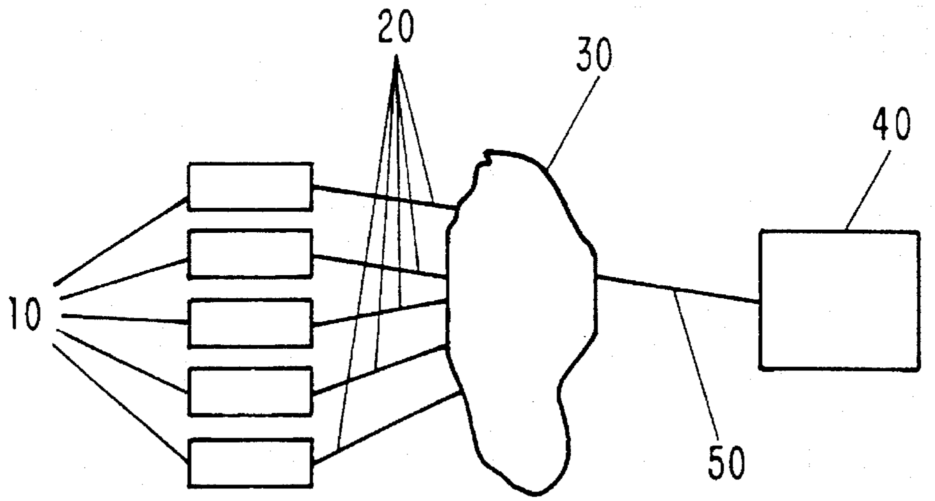
FIG. 1 shows a distributed voting system in which the current invention would be suitable.

FIG. 1 shows a schematic of a distributed voting system. Multiple remote voters 10 have links 20 to a communications network 30. At least one vote gathering facility 40 also has a link 50 to the communications network 30. The voters 10 are capable of establishing connections through the communications network 30 to a vote gathering facility 40. Once a connection is established, the voters 10 communicate their votes to the vote gathering facility 40, which tabulates the results. An example of a suitable communications network would be the telephone system. In that example, the voters 10 would be citizens using telephones, and the telephone lines would serve as the link 20 to the phone system. The vote gathering facility 40 can be implemented as a programmable data processor equipped to interface to telephone lines.

Figure 2:
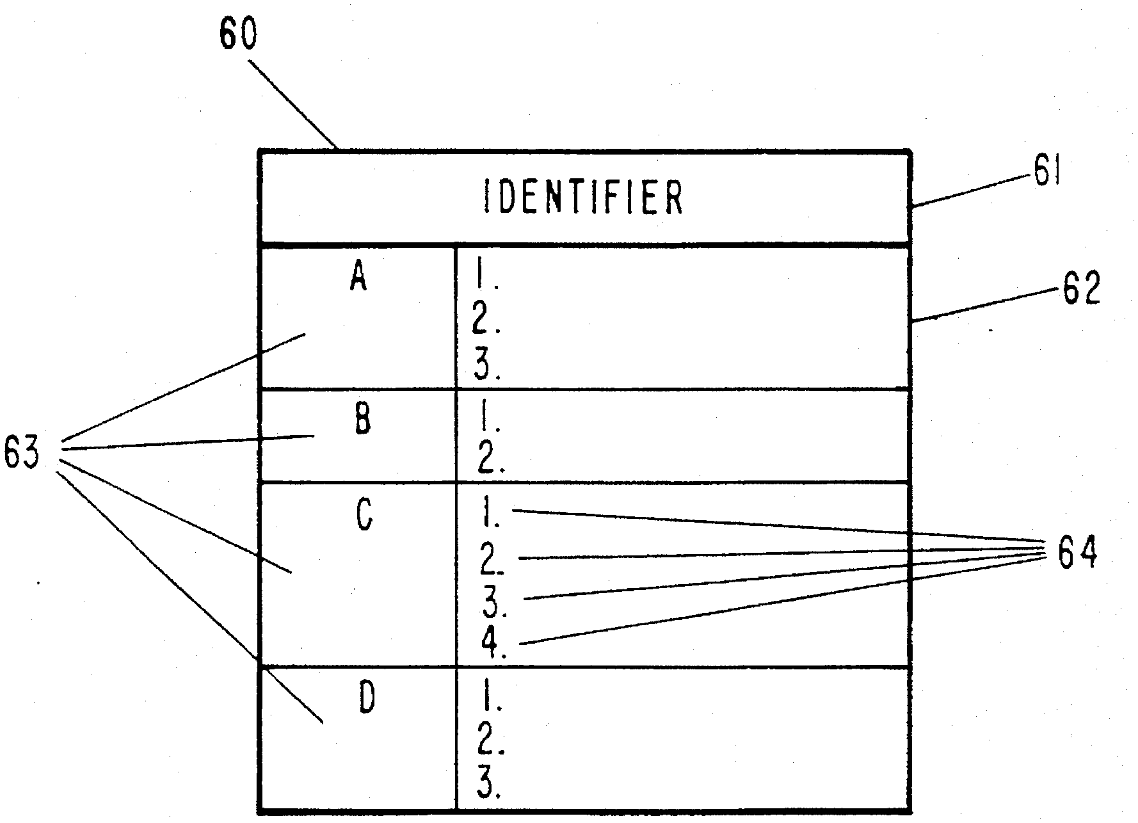
FIG. 2 shows the logical subdivisions of a vote within a distributed voting system.

The votes to be communicated are logically depicted in FIG. 2. Each vote 60 has two major subdivisions, an identifier 61 and a value 62. The identifier 61 is a collection of information that is unique for each vote, and can be used to ensure that no voter casts more than one vote. The value 62 is logically divided further into ballot questions 63. For each ballot question 63 there is at least one choice 64. In general there can be many choices 64 for each question 63. In a simple election, the ballot questions 63 might correspond to individual races. The choices 64 for each ballot question 63 could then be the candidates competing in that race.

There are numerous paradigms suitable for communicating a vote from a remote voter to a vote gathering facility. One simple example would be an interactive method. In this method, a remote voter first establishes a connection with a vote gathering facility. The vote gathering facility then queries the voter for each ballot question. The voter's response to the queries dictate the particular choice to be recorded by the vote gathering facility.

Communications between a remote voter and a vote gathering facility could also be done in a batch mode, where each voter first records the identifier and choices. Once a connection is established with a vote gathering facility, the recorded identifier and choices can be communicated as a group. Those skilled in the art will appreciate that there are many variations possible to effect communications between voters and vote gathering facility.

Figure 3:
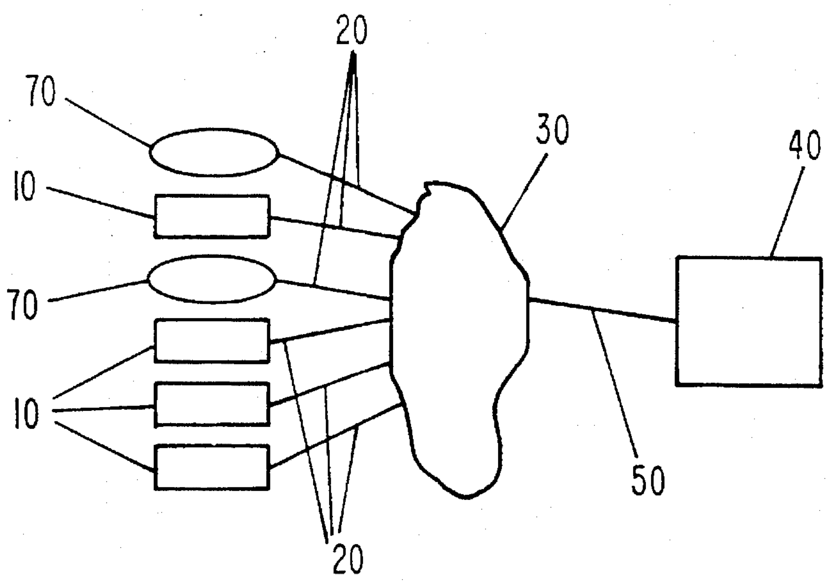
FIG. 3 shows the current invention in a distributed voting system.

In FIG. 3 a distributed voting system with the present invention is shown. Remote voters 10 have links 20 to a communications network 30. A vote gathering facility 40 also has a link 50 to the communications network 30. One or more decoy voters 70 are also linked to the communications network 30. The decoy voters 70 are capable of communicating votes with a vote gathering facility in a similar way as the remote voters 10. The role of the decoy voters 70 is to communicate votes with known identifiers and values to the vote gathering facility. Since these check votes are expected, the vote gathering facility can detect if any check votes have been altered (implying compromise of the system) or are missing (implying tampering or breakdown in the communications network 30, the vote gathering facility 40, or the decoy voter 70). The check votes can also be communicated at predetermined times to provide a further check on system integrity. The communication between a decoy voter and a vote gathering facility should mimic the communication between a remote voter and a vote gathering facility to make it difficult for an outsider to detect check votes, and thereby make it more likely than a counterfeiter will attempt to counterfeit a check vote and thus be detected.

Figure 4:
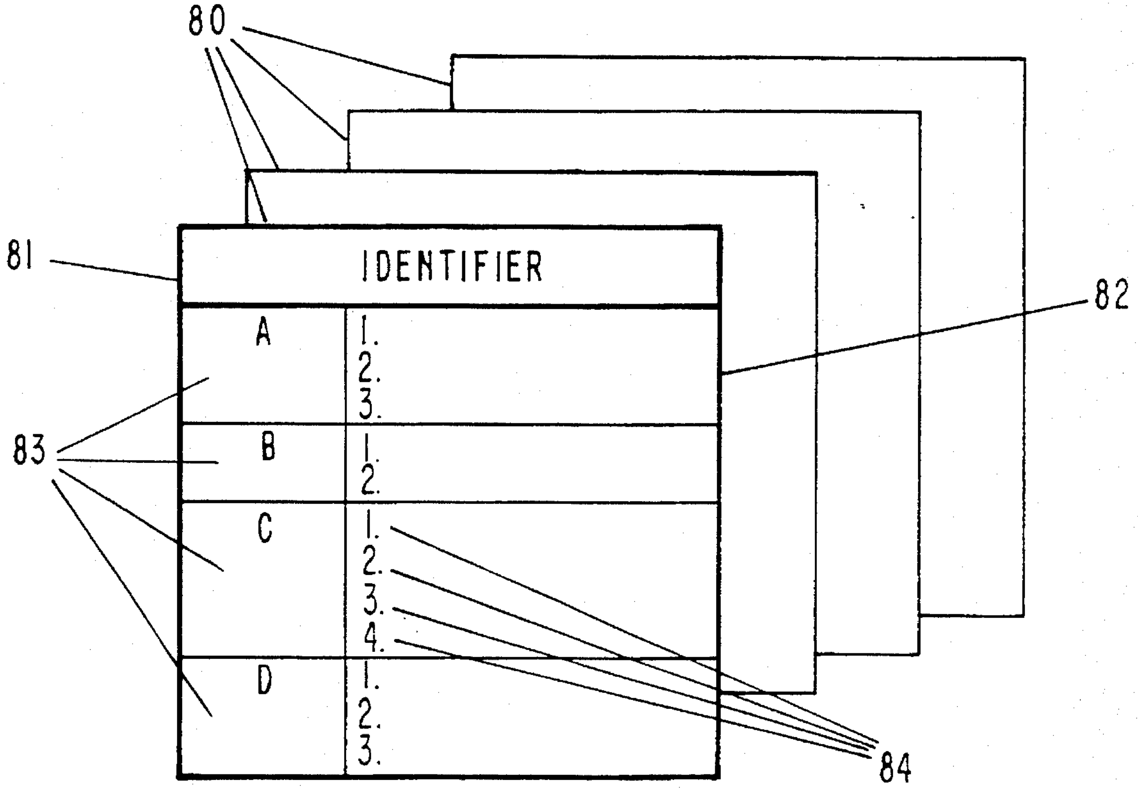
FIG. 4 is a representation of a list of check votes to be sent to the vote gathering facility.

Each decoy voter can be designed to communicate multiple check votes. FIG. 4 shows a set of check votes to be communicated by a decoy voter. Each check vote 80 has a unique identifier 81. The identifiers that belong to check votes are known at the vote gathering facility, so that it can detect incoming check votes. Each check vote 80 has its own associated predetermined value 82, also known at the vote gathering facility. The vote gathering facility can thus compare the choices 84 communicated for each check vote with those expected and thereby detect check votes with incorrect values. Check votes can also have associated predetermined times the check vote is expected to be cast. Failure of a check vote to arrive at its expected time can serve as another indication of error in the system.

Figure 5:
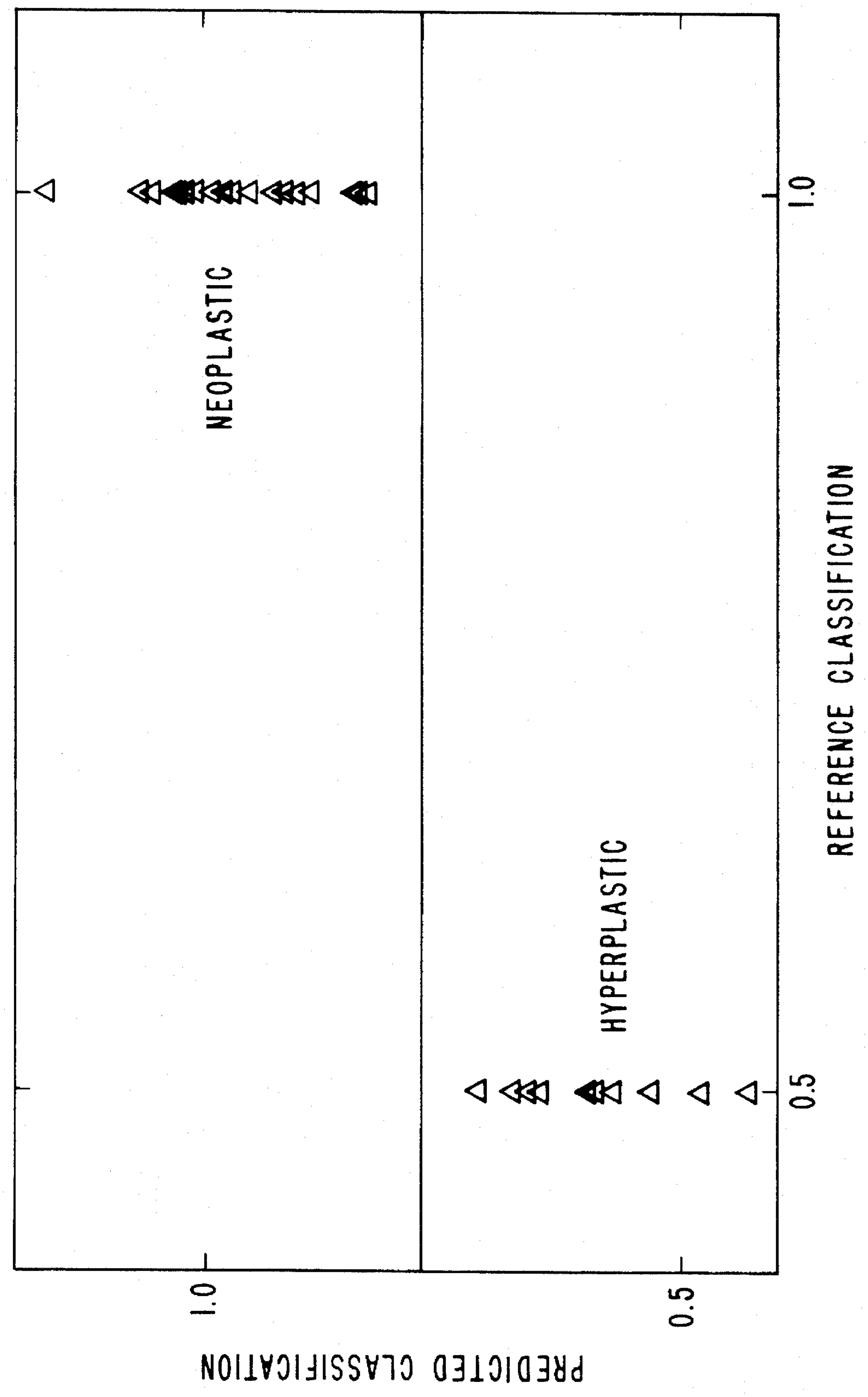
FIG. 5 depicts a decision process for a vote gathering facility used with the current invention.

A portion of the decision tree needed at a vote gathering facility according to the present invention is shown in FIG. 5. An incoming vote 90 is first examined 41 to ascertain whether its identifier matches a check vote identifier. If it does not match a check vote identifier, the vote is a regular vote and can be tabulated 42. If the incoming vote 90 does have a check vote identifier, the vote gathering facility must then compare 43 the value of the incoming vote against the value expected to be associated with that particular check vote identifier. If the values match, then it can be concluded that the check vote is correct and the vote gathering facility can continue 44 to accept votes. If the values do not match, the vote gathering facility can report 45 the error and cause appropriate action to be initiated.

Figure 6:
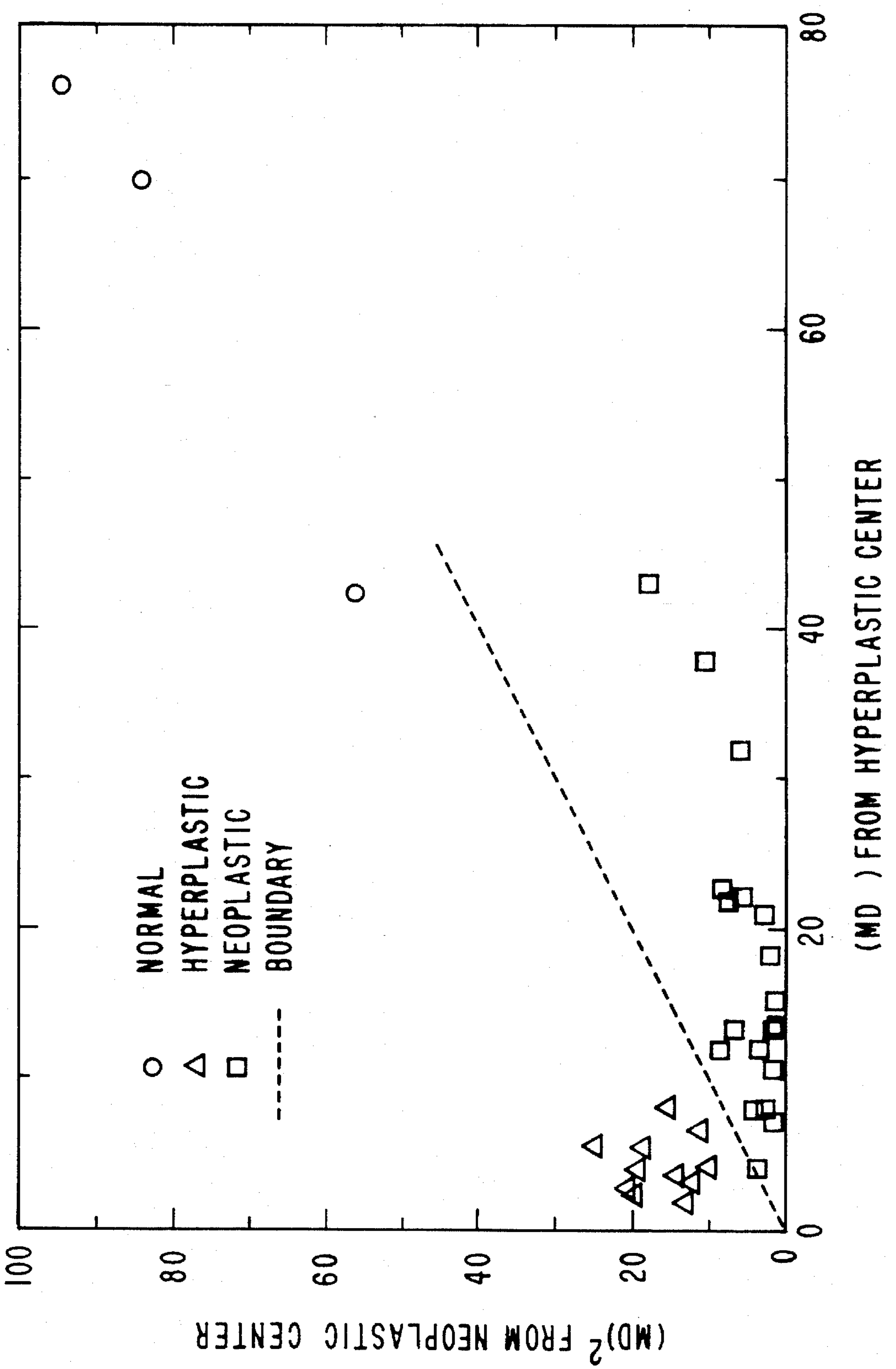
FIG. 6 shows a detailed view of one embodiment of the present invention.

FIG. 6 shows an embodiment of the present invention adapted for use with contemporary telephone and programmable data processing equipment. The decoy voter 79 comprises a programmable data processor 71 including means to store a suitable program 72 and a schedule of check votes to be cast 73. The data processor 71 communicates with a DTMF modem 74. A contemporary personal computer equipped with a disk drive and serial communication port is one example of a suitable decoy voter programmable data processor.

The decoy voter DTMF modem 74 connects between the decoy voter data processor 71 and an ordinary telephone line 21. Suitable DTMF modems are widely available and are commonly used by amateur radio operators for transmission of digital data over radio. The DTMF modem 74 is able to accept commands from the decoy voter data processor 71, go on-hook and off-hook, and produce the DTMF tones produced by contemporary touch tone telephones. The modem 74 can also decode DTMF tones and communicate their values to the decoy voter data processor.

The decoy voter 79 follows its schedule 73 of check votes. When it becomes time to cast the next check vote, the DTMF modem 74 is commanded by the decoy voter data processor 71 to go off-hook and then to dial the vote gathering facility 49 using a telephone switch system 31 such as is commonly found in contemporary industrialized communities. The vote gathering facility 49 can answer with a voice message (for human communications) and a DTMF tone sequence (for machine communications). After detecting the greeting tone sequence, the decoy voter 79 proceeds to cast a check vote. Each voting instruction given by the vote gathering facility 49 can be followed by a DTMF tone sequence that cues the decoy voter 79 for the information expected. Human voters can press telephone buttons to generate the DTMF tones required to register their votes in response to the vote gathering facility's requests. The decoy voter data processor 71 commands the DTMF modem 74 to generate the appropriate DTMF tones to transmit the check vote. The time that elapses from a vote gathering facility 49 request to a decoy voter 79 DTMF response can be varied so that it is difficult to discern between a decoy voter and a human voter.

The vote gathering facility 41 can indicate that the vote has been accepted. The decoy voter data processor 71 then commands the DTMF modem 74 to go on-hook. The decoy voter data processor 71 then waits until the time for the next check vote to be cast. If the vote gathering facility 49 fails to indicate that the vote was accepted, the decoy voter 79 can either flag an error or retry the vote. The vote gathering facility 49 can identify check vote errors as discussed above.

The particular sizes and equipment discussed above are cited merely to illustrate a particular embodiment of the invention. It is contemplated that the use of the invention may involve components having different sizes and characteristics as long as the principle, the detection of anomalies in a distributed voting system by detecting errors in the communications of predetermined check votes, is followed. It is intended that the scope of the invention be defined by the claims appended hereto.

I claim:

1. A quality monitoring system for a distributed voting system comprising:

a) means for transmitting one or more check votes from a voter to a vote gathering facility of the distributed voting system, said check votes having predetermined check identifiers and associated predetermined check values;

b) means for selecting votes having predetermined check identifiers from votes received at the vote gathering facility c) means for discovering fraud or malfunction in the distributed voting system by detecting differences between the values of said selected votes and the predetermined check values associated with said predetermined check identifiers.

2. The apparatus of claim 1 wherein the means for transmitting check votes comprises:

a) means for traversing a list of check votes to be transmitted;

b) means for encoding said check votes into Dual Tone MultiFrequency tones; and c) means for transmitting said Dual Tone MultiFrequency tones to the vote gathering facility.

3. The apparatus of claim 2 wherein the means for transmitting check votes further comprises means for establishing a connection to the vote gathering facility.

4. The apparatus of claim 1 wherein the vote gathering facility transmits query tones to a voter, and wherein said means for transmitting further comprises means for interpreting said query tones so that check values can be transmitted responsive to said query tones.

5. The apparatus of claim 4 wherein a non-constant time separates each vote gathering facility query tone and the associated means for transmitting response.

6. The apparatus of claim 1 wherein the means for transmitting comprises a programmable data processor.

7. The apparatus of claim 1 wherein the means for discovering comprises a programmable data processor.

8. The apparatus of claim 1 wherein the means for transmitting transmits each check vote at a predetermined time associated with said predetermined check identifier, and wherein the means for discovering detects differences between the time each said selected vote is received and the predetermined time associated with said predetermined check identifier.

9. A telephone voting system, wherein each vote has a set of values and a unique identifier, said system comprising:

a) one or more vote gathering facilities comprising:

i) means for storing and accessing one or more predetermined check vote identifiers and associated check values;

ii) means for connecting to incoming telephone calls from callers;

iii) means for transmitting queries to the caller, said queries comprising voice queries and Dual Tone MultiFrequency tones;

iv) means for receiving and interpreting Dual Tone MultiFrequency tones received from the caller;

v) means for translating Dual Tone MultiFrequency tones received from the caller into votes;

vi) means for accumulating votes;

vii) means for selecting votes by detecting vote identifiers that match any of said predetermined check vote identifiers;

viii) means for discovering irregularities by detecting differences between the values transmitted with said predetermined check vote identifiers and said check values associated with the same vote identifiers;

b) one or more decoy voters comprising:

i) means for storing and accessing one or more predetermined check vote identifiers and associated check values;

ii) means for connecting to the vote gathering facility;

iii) means for interpreting Dual Tone MultiFrequency queries from the vote gathering facility; and iv) means responsive to said queries for transmitting said predetermined check vote identifiers and check values to the vote gathering facility.

10. The apparatus of claim 9 wherein said means for storing and accessing in said decoy voters further comprise means for storing and accessing predetermined times associated with said predetermined check vote identifiers, and wherein said means for connecting in said decoy voters further comprise means for connecting at said predetermined times; and wherein said means for discovering in said vote gathering facilities further comprise means for detecting differences between the time said selected votes are received and said predetermined times.

* * * * *

UNITED STATES PATENT AND TRADEMARK OFFICE

CERTIFICATE OF CORRECTION

PATENT NO. : 5,612,871
DATED : March 18, 1997
INVENTOR(S) : David Skogmo

It is certified that error appears in the above-identified patent and that said Letters Patent is hereby corrected as shown below:

The Title page, showing an illustrative figure, should be deleted and substitute therefor the attached title page.

Drawings:
Delete drawing sheets consisting of Figs. 5 & 6 and substitute therefor the drawing sheets consisting of Figs. 5 & 6 as shown on the attached page.

Signed and Sealed this

Twenty-second Day of July, 1997

Attest:

BRUCE LEHMAN

*Attesting Officer* *Commissioner of Patents and Trademarks*

United States Patent [19]
Skogmo

[11] Patent Number: 5,612,871
[45] Date of Patent: Mar. 18, 1997

[54] QUALITY MONITORED DISTRIBUTED VOTING SYSTEM

[75] Inventor: David Skogmo, Albuquerque, N.M.

[73] Assignee: Sandia Corporation, Albuquerque, N.M.

[21] Appl. No.: 289,861

[22] Filed: Aug. 12, 1994

[51] Int. Cl.[6] ........................ G06F 17/60

[52] U.S. Cl. ........................ 395/212; 235/386; 379/92; 379/97; 379/386

[58] Field of Search ........................ 364/401, 409; 235/386; 379/92; 348/1, 2; 455/2

[56] References Cited

U.S. PATENT DOCUMENTS 5,218,528 6/1993 Wise et al. ........................ 364/409
5,278,753 1/1994 Graft, III ........................ 364/409
5,412,727 5/1995 Drexler et al. ........................ 380/24

*Primary Examiner*—Gail O. Hayes
*Assistant Examiner*—Steven R. Yount
*Attorney, Agent, or Firm*—Gregory A. Cone

[57] ABSTRACT

A quality monitoring system can detect certain system faults and fraud attempts in a distributed voting system. The system uses decoy voters to cast predetermined check ballots. Absent check ballots can indicate system faults. Altered check ballots can indicate attempts at counterfeiting votes. The system can also cast check ballots at predetermined times to provide another check on the distributed voting system.

10 Claims, 4 Drawing Sheets

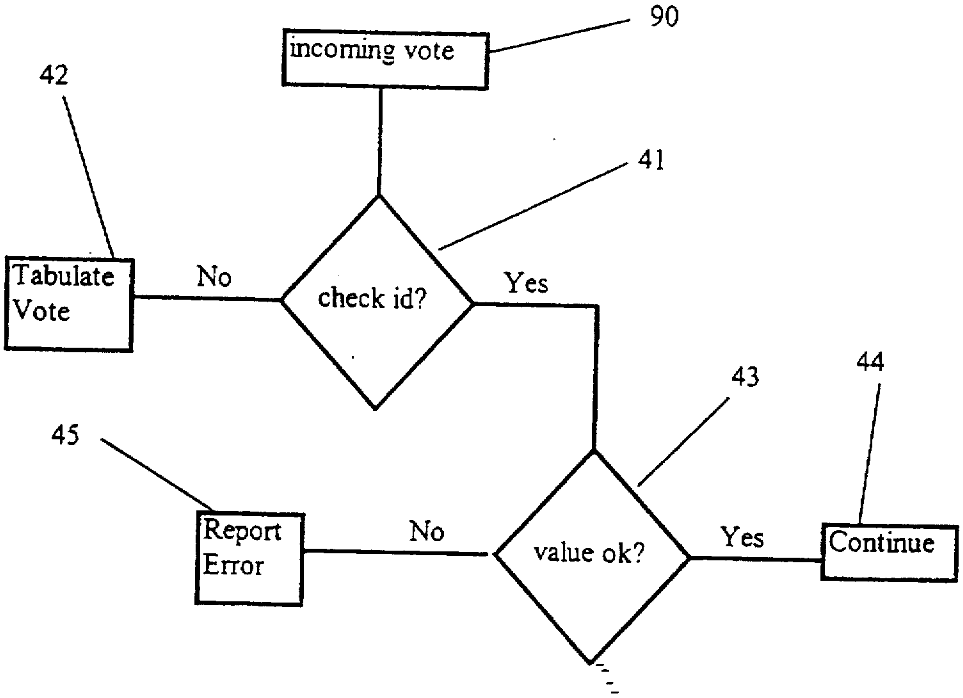

UNITED STATES PATENT AND TRADEMARK OFFICE

CERTIFICATE OF CORRECTION

PATENT NO. : 5,612,871

DATED : March 18, 1997

INVENTOR(S) : David Skogmo

It is certified that error appears in the above-indentified patent and that said Letters Patent is hereby corrected as shown below: Substitute the Figure 5 for Figure 5

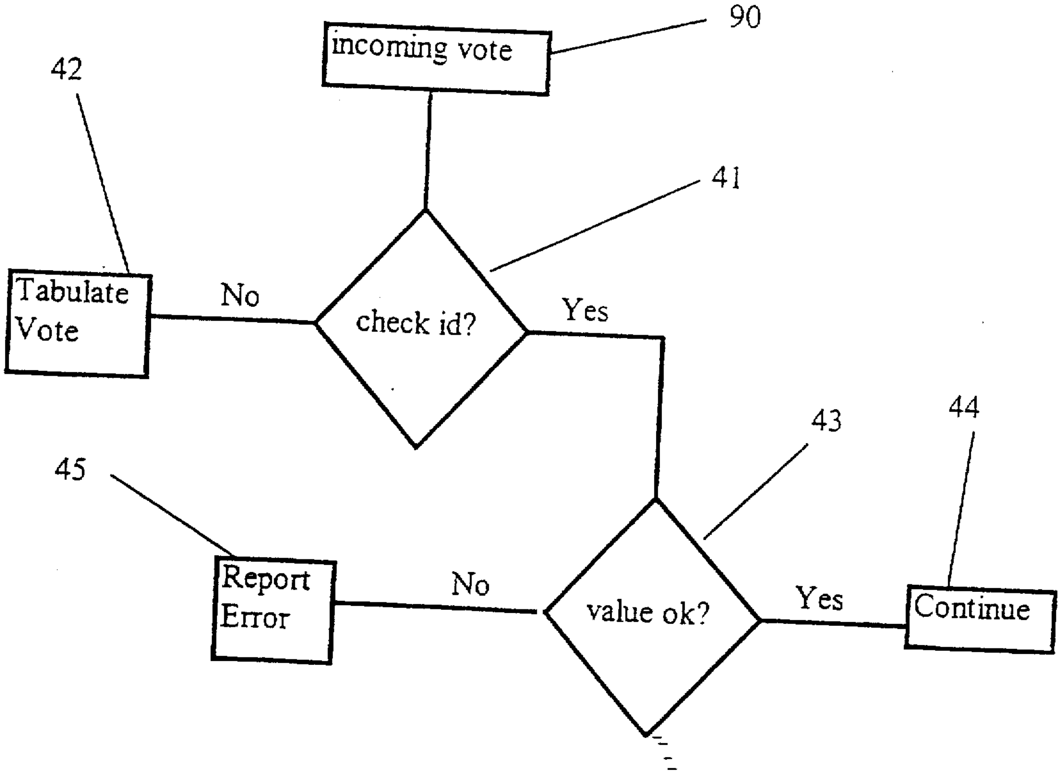

Figure 5

UNITED STATES PATENT AND TRADEMARK OFFICE

CERTIFICATE OF CORRECTION

PATENT NO. : 5,612,871 Page 4 of 4

DATED : March 18, 1997

INVENTOR(S) : David Skogmo

It is certified that error appears in the above-indentified patent and that said Letters Patent is hereby corrected as shown below: Substitute the Figure 6 for Figure 6

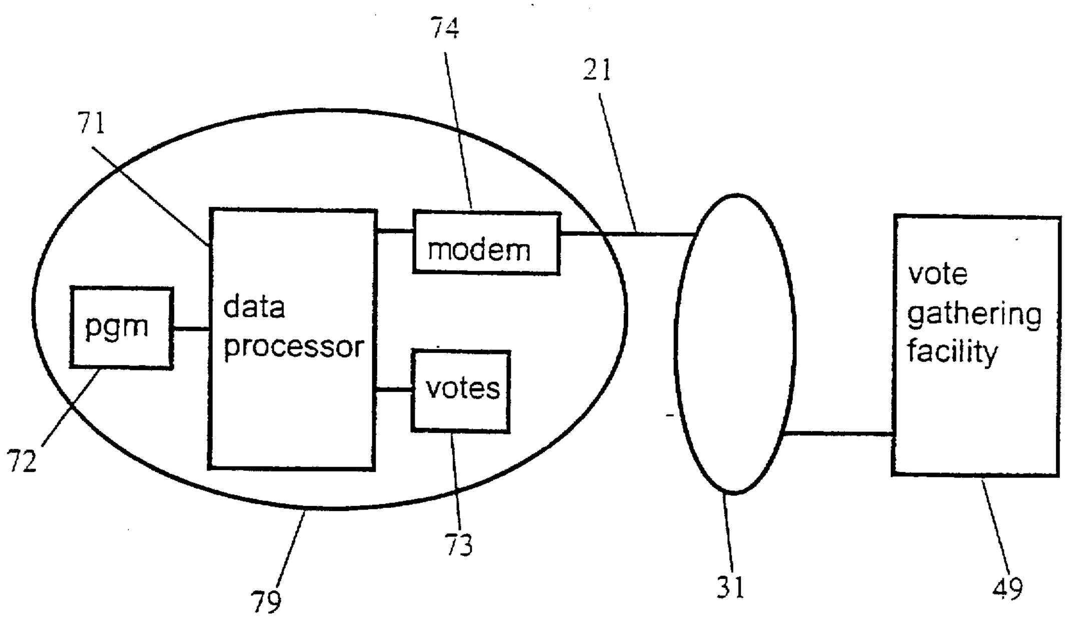

Figure 6